No. 629,073. Patented July 18, 1899.
J. A. GROEBLI & A. H. KURSHEEDT.
MACHINE FOR MIXING SPANGLES.
(Application filed Feb. 29, 1896. Renewed Feb. 2, 1899.)
(No Model.) 5 Sheets—Sheet 1.
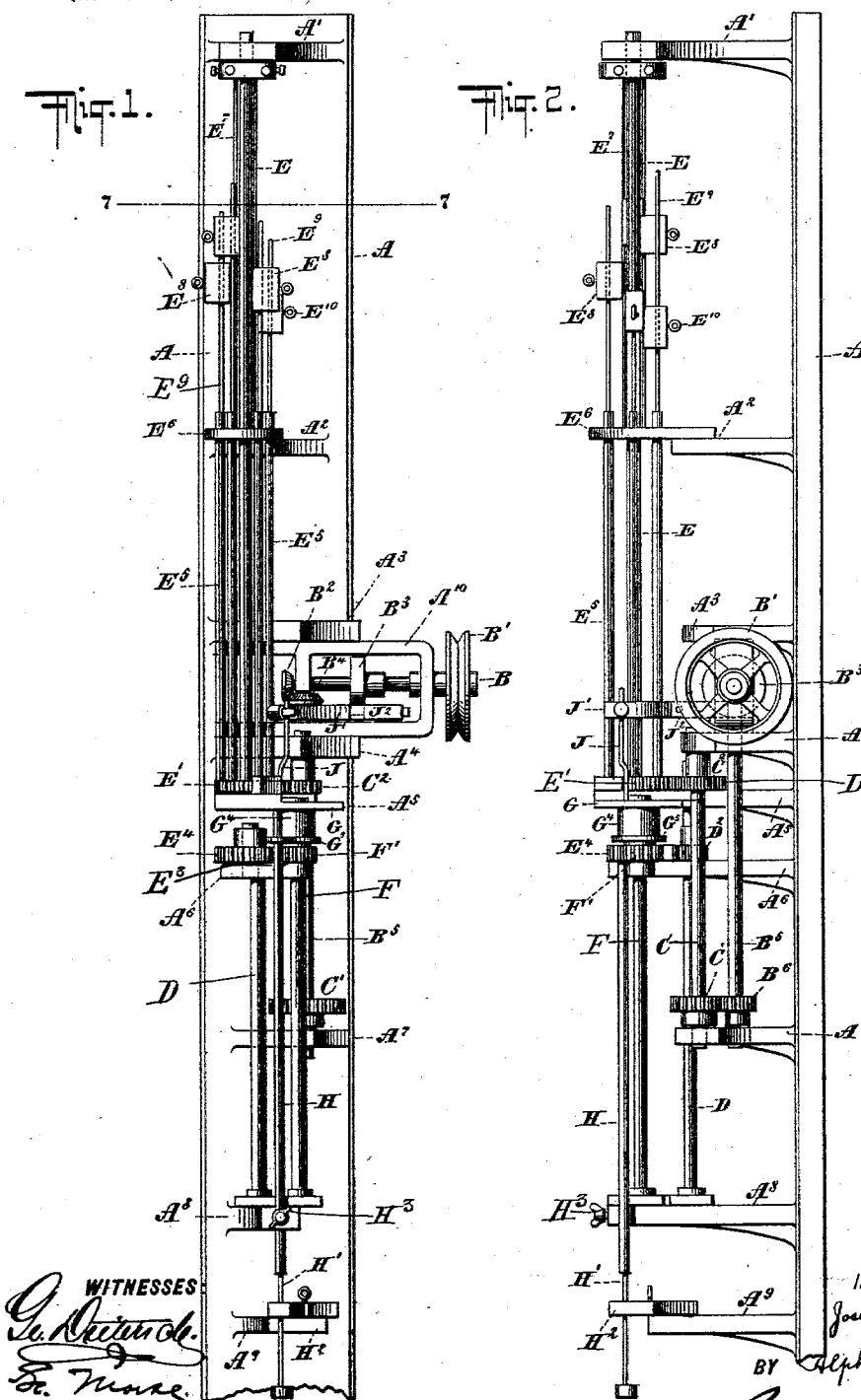

No. 629,073. Patented July 18, 1899.
J. A. GROEBLI & A. H. KURSHEEDT.
MACHINE FOR MIXING SPANGLES.
(Application filed Feb. 29, 1896. Renewed Feb. 2, 1899.)
(No Model.) 5 Sheets—Sheet 2.
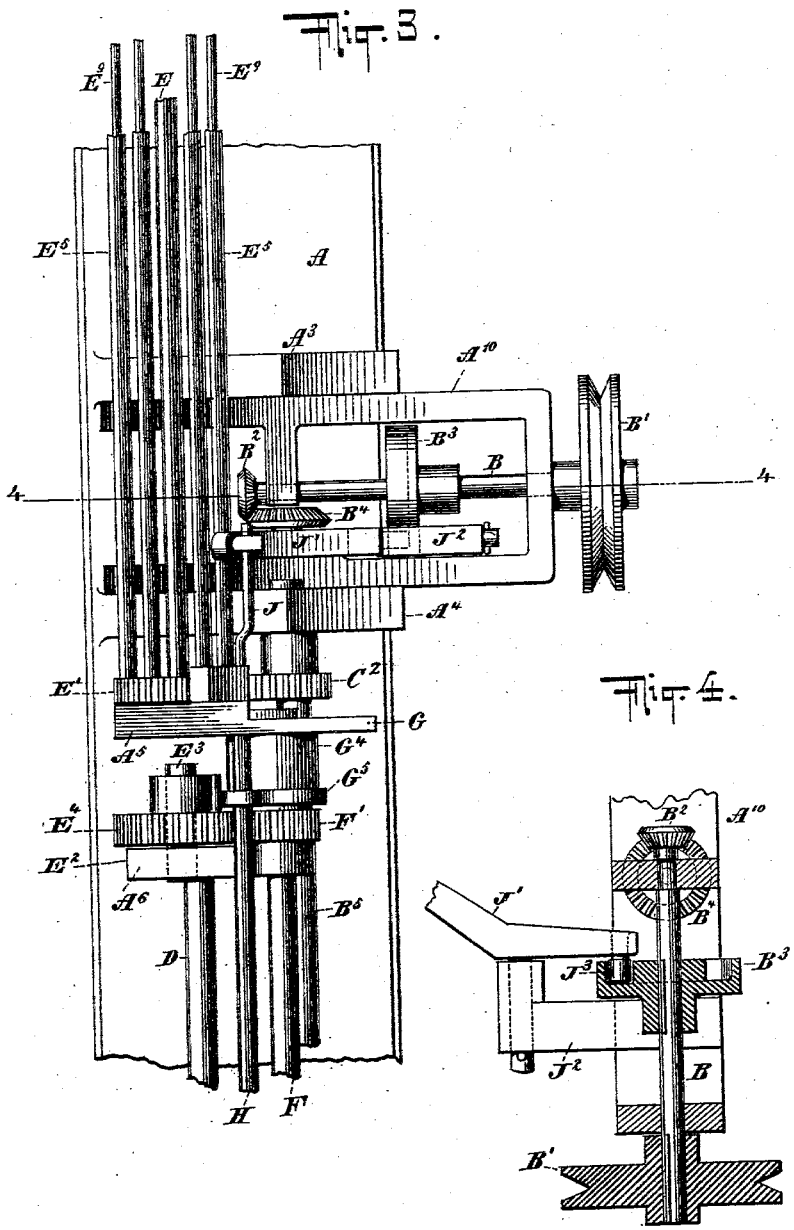
WITNESSES:
INVENTORS
Joseph A. Groebli
and Alphonse H. Kursheedt
BY Briesen & Knauth
ATTORNEYS.

No. 629,073. Patented July 18, 1899.
J. A. GROEBLI & A. H. KURSHEEDT.
MACHINE FOR MIXING SPANGLES.
(Application filed Feb. 29, 1896. Renewed Feb. 2, 1899.)
(No Model.) 5 Sheets—Sheet 3.
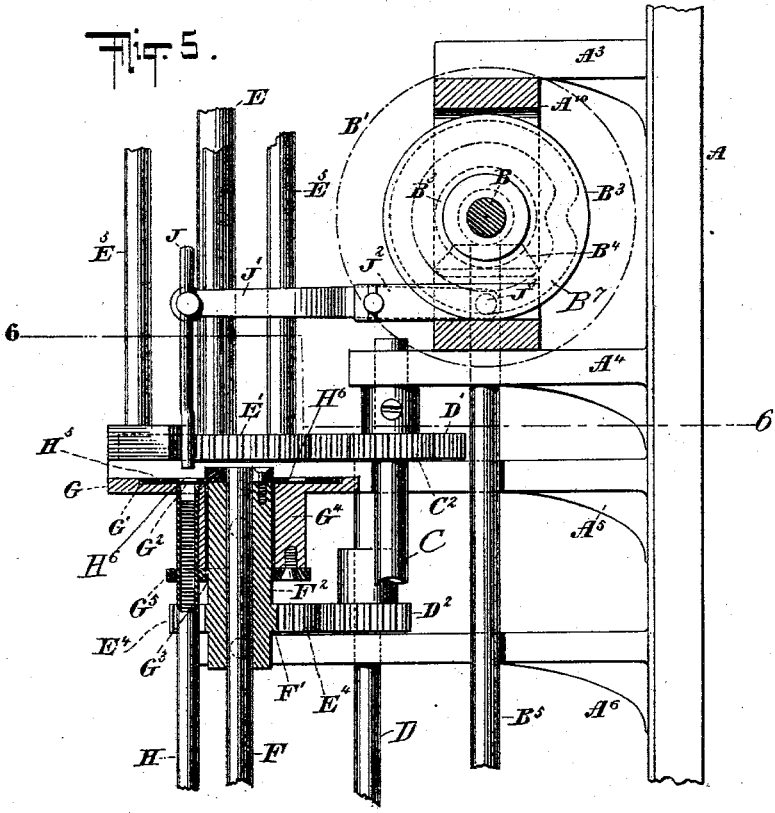
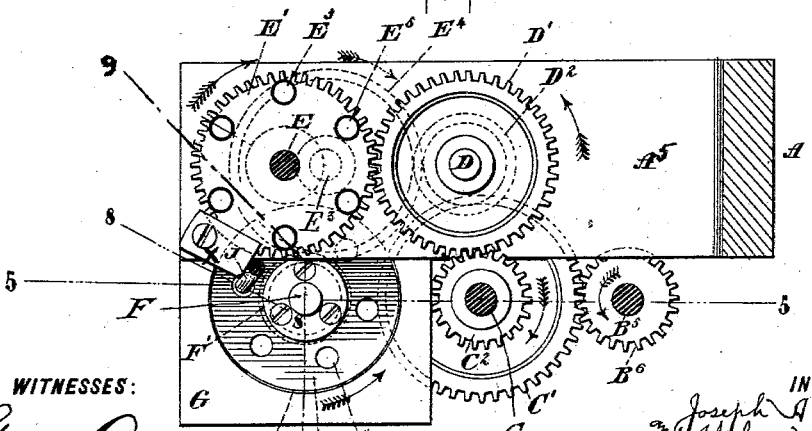
WITNESSES:
INVENTORS
Joseph A. Groebli
Alphonse H. Kursheedt
BY
Briesen & Knauth
ATTORNEYS.

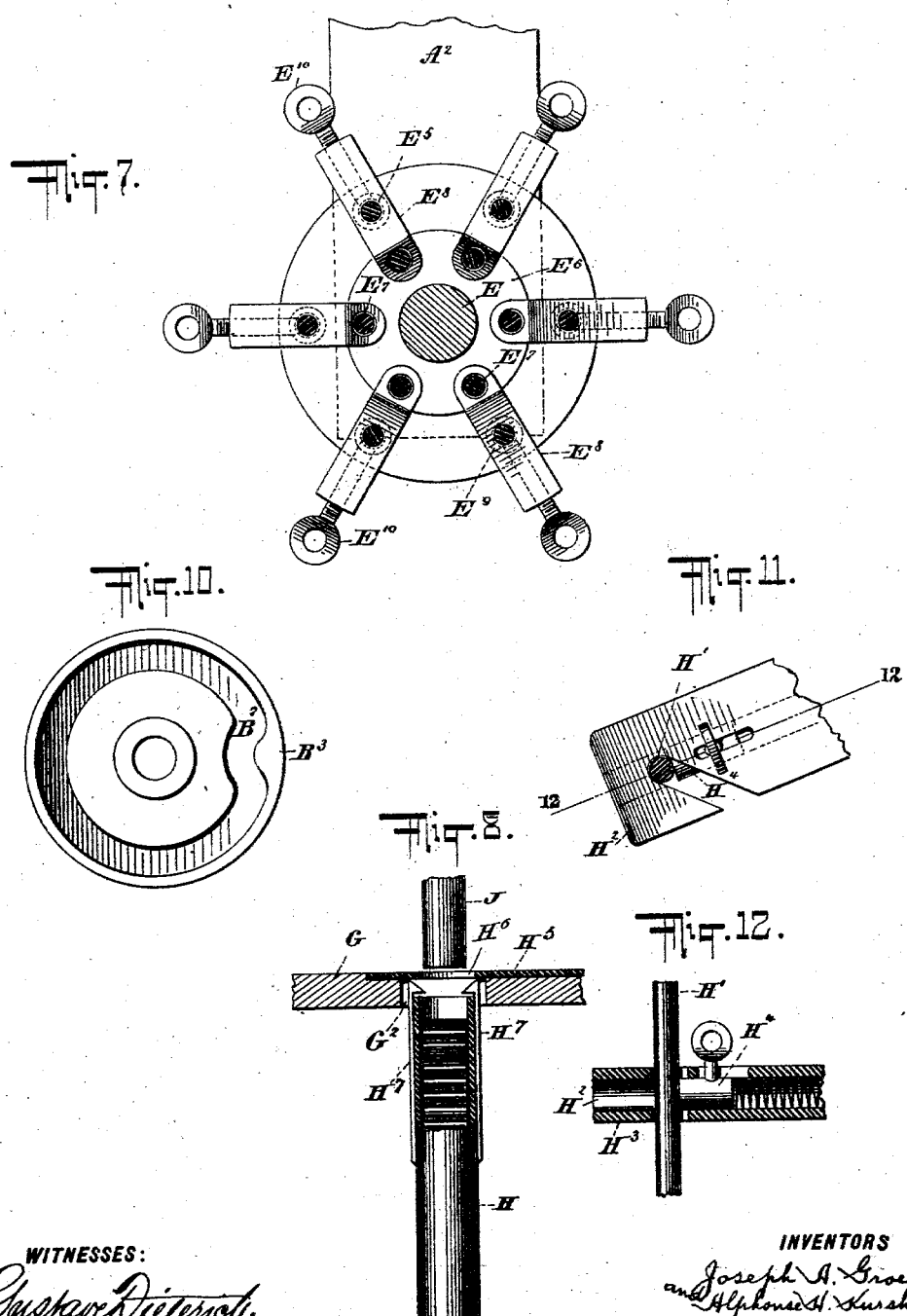

No. 629,073. Patented July 18, 1899.
J. A. GROEBLI & A. H. KURSHEEDT.
MACHINE FOR MIXING SPANGLES.
(Application filed Feb. 29, 1896. Renewed Feb. 2, 1899.)
(No Model.) 5 Sheets—Sheet 5.
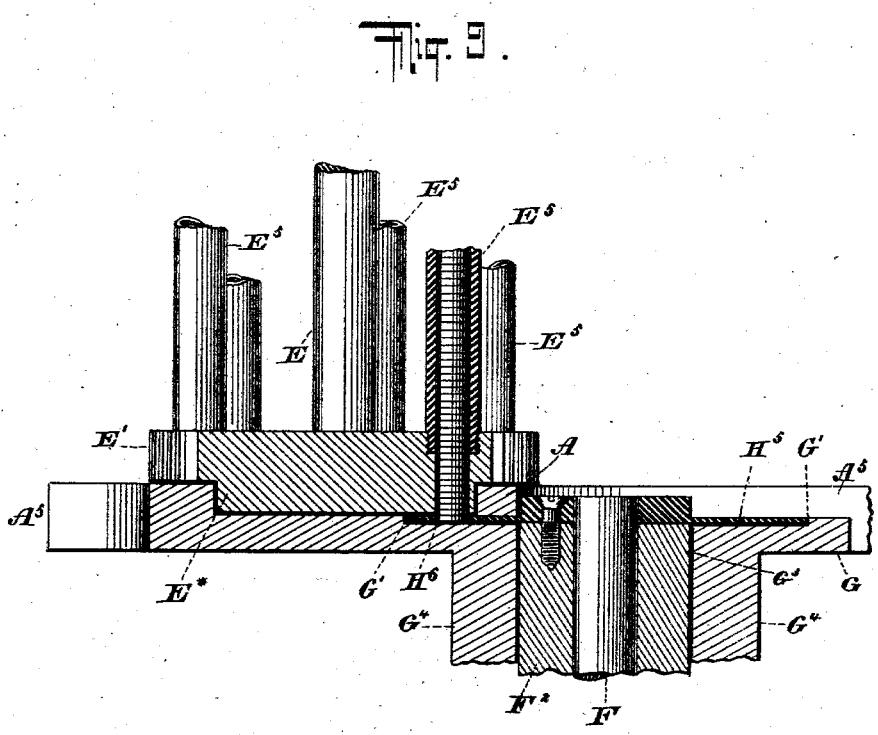

UNITED STATES PATENT OFFICE.

JOSEPH A. GROEBLI AND ALPHONSE H. KURSHEEDT, OF NEW YORK, N. Y., ASSIGNORS TO SAID KURSHEEDT.

MACHINE FOR MIXING SPANGLES.

SPECIFICATION forming part of Letters Patent No. 629,073, dated July 18, 1899.

Application filed February 29, 1896. Renewed February 2, 1899. Serial No. 704,301. (No model.)

*To all whom it may concern:*

Be it known that we, JOSEPH A. GROEBLI and ALPHONSE H. KURSHEEDT, residents of the city, county, and State of New York, have invented an Improved Machine for Mixing Spangles, of which the following is a specification.

Our invention relates to spangle mixing and filling machines, and has for its object to produce a machine for mixing and filling differently-colored spangles, as may be required.

In ornamenting fabrics with spangles it is the present practice to use spangles of different colors, it being necessary to recur to different sources of supply for different-colored spangles. Our present invention is designed to obviate this difficulty by automatically mixing the spangles and feeding them to supply-tubes, which can be removed and placed on a sewing-machine or other place where the spangles are maintained in such a position that they can be fed to the fabric to which they may be attached.

The machine forming the subject-matter of this invention is specially designed for mixing and filling the feeder-tubes in the spangle-sewing machine forming the subject-matter of application for Letters Patent, Serial No. 567,636, filed by us; but it will be understood that the machine may be used for various other purposes, or it may be connected directly with the said spangle-sewing machine to automatically mix the spangles and fill the receiving-tube, which may constitute the feeder-tube of the sewing-machine.

Our invention consists in the construction hereinafter set forth and claimed.

The machine forming the subject-matter of this invention may be briefly said to comprise a series of sources of supply for the spangles, which is shown in the present instance as a series of spangle-containing tubes, coöperating with which is a spangle-carrying device which takes the spangles first from one and then from another of the sources of supply and deposits them in a spangle-receiving tube in the order in which they were received from the spangle-containing tubes. Thus in the present instance six spangle-containing tubes are provided, and if different-colored spangles are contained in each tube then the spangle-carrying device will convey to and place within the spangle-receiving tube a rouleau of spangles of six different colors, the color of one spangle alternating with that of the next adjacent spangle.

Our invention will be understood by referring to the accompanying drawings, in which—

Figure 1 is a front view or elevation of a spangle-mixing machine embodying our invention. Fig. 2 is a side view thereof. Fig. 3 is an enlarged broken-away detail front view of the main operating parts of the machine. Fig. 4 is a detail sectional view on line 4 4 of Fig. 3. Fig. 5 is an enlarged sectional detail view of the portion of the mechanism represented in Fig. 3. Fig. 6 is a section on line 6 6 of Fig. 5, showing also, line 5 5, the section-line on which Fig. 5 is taken. Fig. 7 is an enlarged transverse sectional view of a portion of the machine, looking from above, the section being taken on line 7 7 of Fig. 1. Fig. 8 is an enlarged sectional detail view of the platform, receiving-tube, and tamping-bar of the machine, the section being taken on line 8 8 of Fig. 6. Fig. 9 is an enlarged sectional detail view of a feeding-tube and its accessories, the section being taken on line 9 9 of Fig. 6, with parts removed for purpose of clearness. Fig. 10 is a detail face view of the tamping-bar-operating cam. Fig. 11 is an enlarged detail side view of the friction device for the spangle-supporting rod entering the receiving-tube. Fig. 12 is a fragmental sectional view on line 12 12 of Fig. 11.

The machine which we have illustrated comprises a bed or back plate A, from which project the supporting means for the working parts, consisting in the present instance of brackets $A'$ $A^2$ $A^3$ $A^4$ $A^5$ $A^6$ $A^7$ $A^8$ $A^9$.

B is the operating-shaft of the machine, which is journaled in the yoke $A^{10}$, supported by the brackets or standards $A^3$ $A^4$, and carries a pulley $B'$, a miter-wheel $B^2$, and a tamping-bar-operating cam $B^3$. Gearing with the miter-wheel $B^2$ is a miter-wheel $B^4$, which is carried upon a vertical shaft $B^5$, stepped in the bracket $A^7$. Another shaft C is placed substantially parallel with the shaft $B^5$ and is journaled in the brackets $A^7$ and $A^4$, and carries near the lower end thereof a gear C', Fig. 2, which meshes with the gear $B^6$ on the shaft $B^5$. This shaft C also carries, near the upper end thereof, a pinion $C^2$, which meshes with a pinion D' on a shaft D. This pinion D' also meshes with a pinion E' on the shaft E, which terminates at the bracket $A^5$, and is supported at the upper end in the bracket A' and by the bracket $A^2$. This pinion E' is provided with a boss $E^*$, which rotates within a bearing or recess formed within the bracket $A^5$, as clearly indicated in Fig. 9. Beneath the pinion E' and stepped in a lug $E^2$, forming part of the bracket $A^6$, is a short idle shaft $E^3$, carrying a pinion $E^4$, which meshes with the pinion $D^2$ upon the shaft D and with a pinion F', which drives the spangle-feeding shaft F.

Having described the motion-transmission mechanism, we will now proceed to describe the various driven parts and their functions.

As we before stated, the object of the machine is to mix spangles of different colors and to automatically place them in feeder-tubes so that they may be brought thereby up to the fabric and secured thereto in order to produce party-colored designs thereon. To this end we provide a number of spangle-containers or feed-tubes $E^5$, each of which may contain a rouleau of spangles. All the spangles in any one tube may be of the same color. These tubes are carried upon the pinion E', which is perforated in prolongation of the bores of the tubes, so as to permit the passage of the spangles therethrough, (this construction being shown clearly in Fig. 9,) and a block X, Fig. 6, bearing upon the upper face of the pinion E' prevents any vertical movement thereof which would allow of the spangles passing between the lower face of the pinion and the parts with which it coöperates. This pinion E', as before stated, is carried upon the shaft E, which is journaled in the brackets A' $A^2$, the upper ends of the tubes themselves being carried in a plate $E^6$, (shown in detail in Fig. 7,) working in the bracket $A^2$ and forming a collar on the shaft E. Arranged parallel to the tubes $E^5$ are a series of guide-rods $E^7$, upon which weights $E^8$ slide. Passing through the weights $E^8$ are push-rods $E^9$, which are adjustable in the weights, being held in their adjusted positions by set-screws $E^{10}$. Each of these push-rods enters a spangle-containing tube and serves by its weight to press the spangles downward to positively forward the spangles in the said tube. The gang of spangle-containing tubes is mounted over the platform G, which is recessed on its upper face with a circular recess G', Figs. 5 and 9, and perforated at $G^2$ for the passage of spangles, and is also perforated centrally at $G^3$ for the passage of an upwardly-extending sleeve $F^2$, which carries the pinion F', before referred to, the perforation $G^3$ being walled by a downwardly-depending sleeve $G^4$, carrying upon its lower surface a guide-plate $G^5$. Seated below the aperture $G^2$ in the platform G is a spangle-receiving tube H, which passes through the guide-plate $G^5$ and whose upper end is provided with spring-dogs $H^7$, and the open end of the receiving-tube is held in close proximity to the platform G, as by a set-screw $H^{13}$ in the bracket $A^8$. The spangle-receiving tube H extends through and below the bracket $A^8$ and receives the upper end of a braked spangle-supporting rod H', which receives the thrust of the spangles and is itself frictionally supported in a clip or bearing $H^2$, carried in the bracket $A^9$, and which clip or bearing may be of any desired construction, in the present instance consisting, as shown in detail in Figs. 11 and 12, of a tube $H^3$, apertured laterally for the passage of the spangle-supporting rod H' and containing a spring-pressed plug $H^4$, which is impelled against the rod H', but permits the rod to slide down as pressure is applied to the rod from above.

Carried by the shaft F and sleeve $F^2$ is a spangle-transferring feeding device (shown as comprising a spangle-feed plate $H^5$) which is contained and adapted to rotate within the recess G' in the platform and is apertured with a series of apertures $H^6$, which as the plate rotates with the shaft F and sleeve $F^2$ successively register first with the upper open end of the spangle-receiving tube H and with the path of feed of each of the gang of spangle-containing tubes $E^5$, the apertures $H^6$ being spaced apart in such fashion that an aperture $H^6$ will come under the lower open end of each of the spangle-containing tubes $E^5$ as the parts rotate, this feature being clearly shown in Fig. 9. A tamping-bar J is hung by a pivoted lever J' over the aperture $G^2$ in the platform G and is adapted to pass through the spangle-feeding plate $H^5$, the aperture $G^2$ in the platform, and into the spangle-receiving tube H, so as to drive the spangle into the said receiving-tube. The lever J' is pivoted in a bracket $J^2$, supported from the yoke $A^{10}$, and is provided in the end opposite to the tamping-bar with a bowl $J^3$, entering the groove $B^7$ in the tamping-bar-operating cam $B^3$. As will be readily seen, rotation of the pulleys B' and shaft B will rotate the cam $B^3$, causing the lever J' to be vibrated and the tamping-bar J to be reciprocated up and down through the apertures $H^6$ and $G^2$ and into and out of the spangle-receiving tube, one downward movement of the tamping-bar being had for each revolution of the main shaft B. It is apparent, therefore, that in the construction shown the parts must be so geared that six revolutions of the main shaft will be had for each revolution of the pinion E' and the spangle-feeding plate $H^5$.

Having described the various parts of the mechanism which we have designed for carrying out our invention, we will now proceed to describe its operation. For this purpose we will suppose that each of the spangle-containing tubes $E^5$ contains a rouleau of spangles which are forwarded in the tube by the weights E⁸ and rods E⁹, the lowermost spangles resting upon and sliding on the platform G as the gang of spangle-carrying tubes is revolved. Upon setting the pulley B' in rotation the various parts will execute their prescribed motions—that is to say, the spangle-carrying tubes will be revolved in the direction of the arrow, Fig. 6, the spangle-feeding plate H⁵ will be revolved through the intermediate gearing described in an opposite direction, as indicated by the arrow in Fig. 6, and as each aperture in the spangle-feeder comes beneath the open mouth of a spangle-containing tube one or more of the spangles will enter the aperture H⁶ and will be carried along by the spangle-feeder, the gang of spangle-containing tubes continuing its rotation and the spangle or spangles carried by the spangle-feeder being brought up in the ordinary course of rotation to the aperture G² over the open mouth of the spangle-receiving tube H, at which instant the tamping bar or plunger J will descend, driving the spangle or spangles into the spangle-receiving tube, the spangle or spangles acting as a follower to press the rod H' downward in the tube and the spring-dogs H⁷ serving to prevent the spangles from being lifted out of the tube should they adhere to the tamping bar or plunger. These operations are repeated, the spangles being brought up to the point of intersection of the paths of travel of the gang of spangle-tubes and the apertures H⁶, and from thence carried by the spangle-feeding plate H⁵ to the aperture G² and driven into the tube H, so that the tube H will contain spangles of different colors, the arrangement of colors depending upon the color of the spangles in the individual spangle-containing tubes. It will be observed that the motions imparted to the spangles are positive motions—that is to say, the spangles are pressed downward in the spangle-containing tubes E⁵ by the positive pressure of a weight E⁸ and follower-rod E⁹ and are thence removed in an orderly manner by the spangle-feeding plate, as each of the apertures therein coincides with one of the spangle-containing tubes, the spangles being held therein by the full portions or surface of the spangle-feeding plate when the apertures therein are out of register with one of the spangle-feeding tubes. The spangles are thus carried into position to be driven into the spangle-receiving tube, are driven thereinto by the positive action of a tamping-bar, and are supported from beneath by a frictionally-held supporting-rod H', which rod is pressed forward by the positive pressure of the tamping-bar J through the medium of the rouleau of spangles in the tube H, acting as a follower to said rod. After a tube H has been filled in the manner described it is taken out of the machine and replaced by an empty tube, when the filled tube may be placed in the sewing-machine to feed the spangles to the material to which they are to be sewed.

What we claim, and desire to secure by Letters Patent, is—

1. A spangle mixing and filling machine comprising spangle-containers, a rotary spangle-feeder having a series of spangle-receiving openings therein, means for rotating said spangle-feeder and a removable spangle-receiver with which the openings in the spangle-feeder are adapted to come into exact registration.

2. A spangle mixing and filling machine comprising moving spangle-containers, mechanism for moving said containers, a rotary spangle-feeder having a series of spangle-receiving openings therein, means for operating said spangle-feeder and a removable spangle-receiving tube with which the openings in the spangle-feeder are adapted to come into exact registration when the feeder is rotated.

3. A spangle mixing and filling machine comprising revolving spangle-containers, means for operating said containers, a rotary spangle-feeder intersecting the circle of revolution of the spangle-containers, means for operating said spangle-feeder and a removable receiver within the circle of revolution of the spangle-feeder.

4. In an automatic spangle mixing and filling machine, the combination of spangle-containers, a rotary spangle-feeder and a spangle-receiving tube.

5. In an automatic spangle mixing and filling machine, the combination of moving spangle-containers, a moving spangle-feeder having a plurality of spangle-receiving openings therein which exactly coincide with the openings in each of the spangle-containers, the paths of movement of said spangle-containers and spangle-feeder intersecting and a spangle-receiver, the spangle-receiving opening thereof being in the path of movement of the openings in the spangle-feeder, and the spangle-receiving opening in the receiver exactly coinciding with the spangle-openings in the spangle-containers and spangle-feeder.

6. In an automatic spangle mixing and filling machine, the combination of revolving spangle-containers, a rotary spangle-feeder having a plurality of spangle-receiving openings therein which exactly coincide with the openings in each of the spangle-containers, the paths of revolution of said spangle-containers and spangle-feeders intersecting and a removable spangle-receiving tube, the spangle-receiving opening thereof being in the path of movement of the openings in the spangle-feeder, and the spangle-receiving opening in the spangle-receiving tube exactly coinciding with the spangle-openings in the spangle containers and feeder.

7. In an automatic spangle mixing and filling machine, the combination of revolving spangle-containers, a rotary spangle-feeder intersecting the circle of revolution of the spangle-carriers and a spangle-receiving tube combined in operative relation.

8. In an automatic spangle mixing and filling machine, the combination of one or more spangle-containers having means for moving the spangles therethrough, a spangle-receiving tube having means for retarding the movement of spangles therethrough, combined with transferring means in the nature of a spangle-feeder for transferring spangles from the spangle-carrier to the receiving-tube and means for impelling the spangles in the receiving-tube.

9. In an automatic spangle mixing and filling machine, the combination of spangle-containers with a spangle-receiving tube and a transferring device the openings in which are adapted to register with said tube, whereby the spangles can be transferred from the containers into the receiving-tube and means independent of the spangle-feeder for impelling the spangles in the receiving-tube.

10. In an automatic spangle mixing and filling machine, the combination of revolving spangle-containers and a receiving-tube together with a rotary transferring device, the openings in which are adapted to register with said receiving-tube, whereby spangles may be transferred from the revolving containers into the receiving-tube, a tamping bar or plunger independent of said transferring device for impelling the spangles in the receiving-tube and means for automatically operating said tamping-bar.

11. In a spangle mixing and filling machine, the combination of a spangle-container and a receiver together with a transferring device for transferring spangles from the container to the receiver, a tamping bar or plunger for impelling the spangles in the receiver and means for retarding the movement of the spangles in the receiver.

12. In a spangle mixing and filling machine, the combination of a spangle-container, a spangle-receiver, a transferring device for transferring spangles from the container to the receiver, means for forwarding the spangles in the receiver and a braked rod, as H', entering the receiver and sustaining the pressure on the spangles.

13. In an automatic spangle mixing and filling machine, the combination of a revolving gang of spangle-containers combined with a feed-plate $H^5$ and a spangle-receiving tube.

14. In an automatic spangle mixing and filling machine, the combination of a plurality of spangle-carriers, a feed-plate, a spangle-receiving tube, the feed-plate constituting the means for transferring the spangles from the containers to the receiving-tube.

15. In an automatic spangle mixing and filling machine, the combination of a plurality of spangle-containers, a feed-plate, a spangle-receiving tube, the feed-plate constituting the means for transferring the spangles from the containers to the receiving-tube and means for forwarding the spangles therein.

16. In a spangle mixing and filling machine, the combination of a plurality of spangle-containers, a feed-plate, a spangle-receiver, the feed-plate constituting the means for transferring the spangles from the containers to the receiver, means for forwarding the spangles in the receiver, and means for retarding the movement of the spangles in the receiver.

17. In an automatic spangle mixing and filling machine, the combination of a plurality of spangle-containers, a feed-plate, a spangle-receiving tube, the feed-plate constituting the means for transferring the spangles from the containers to the receiving-tube, and a tamping bar or plunger for forwarding the spangles from the feed-plate to the receiving-tube.

18. In a spangle mixing and filling machine, the combination of a plurality of spangle-containers, a feed-plate, a spangle-receiver, the feed-plate constituting the means for transferring the spangles from the containers to the receiver, means for forwarding the spangles in the receiver and a braked rod receiving the thrust of the spangles.

19. In a spangle mixing and filling machine, the combination of a perforated platform, a spangle-receiver in communication with the perforation, spangle-container and a spangle-feeder intervening between the spangle-container and the platform.

20. In a spangle mixing and filling machine, the combination of a recessed apertured platform, a spangle-receiver in communication with the aperture, a spangle-container and a spangle-feeder comprising a perforated plate sunk in the recess of the platform.

21. In an automatic spangle mixing and filling machine, the combination of a revolving gang of spangle-containers, a receiving-tube and a rotary feeder-plate for conveying spangles from the containers to the receiving-tube.

22. In an automatic spangle mixing and filling machine, the combination of a revolving gang of upright tubes constituting spangle-containers, a receiving-tube for the spangles and a transferring device for transferring spangles from the spangle-containers to the receiving-tube.

23. In an automatic spangle mixing and filling machine, the combination of a revolving gang of upright spangle-containing tubes, a moving spangle-feeder intersecting the path of revolution of the tubes and a spangle-receiving tube for receiving the spangles from the spangle-feeder.

24. In an automatic spangle mixing and filling machine, the combination of a revolving gang of upright spangle-containing tubes, a moving spangle-feeder intersecting the path of revolution of the tubes, a spangle-receiving tube for receiving the spangles from the spangle-feeder and means for forwarding the spangles in the receiving-tube.

25. In an automatic spangle mixing and filling machine, the combination of a revolving gang of upright spangle-containing tubes, a moving spangle-feeder intersecting the path of revolution of the tubes, a spangle-receiver for receiving the spangles from the spangle-feeder and a vibrating tamping bar or plunger entering the receiver to forward spangles therein.

26. In a spangle mixing and filling machine, the combination of a revolving gang of upright spangle-containing tubes, a moving spangle-feeder intersecting the path of revolution of the tubes, a spangle-receiving tube for receiving the spangles from the spangle-feeder, means for forwarding the spangles in the receiving-tube and means for retarding the movement of the spangles in the receiving-tube.

27. In a spangle mixing and filling machine, the combination of a revolving gang of upright spangle-containing tubes, a moving spangle-feeder intersecting the path of revolution of the tubes, a spangle-receiver for receiving the spangles from the spangle-feeder, means for forwarding the spangles in the receiver and a braked rod for entering the spangle-carrier and receiving the thrust of the spangles.

28. In a spangle mixing and filling machine, the combination with a main shaft B, spangle-container and a spangle-feeder operated from the main shaft, a spangle-receiver, a rocking lever J', a tamping-bar J carried at or near one end thereof and a cam upon the main shaft for actuating the same.

29. In a spangle mixing and filling machine, the combination of an apertured platform, a spangle-receiving tube in communication with the aperture, a tamping bar or plunger, a feeding device for bringing up a spangle to the aperture, means for entering the bar into the spangle-receiving tube, whereby the spangle is driven therein and means for preventing the spangle from being carried along by the bar on its return movement out of the tube.

JOSEPH A. GROEBLI.
ALPHONSE H. KURSHEEDT.

Witnesses:
  MAURICE BLOCK,
  CHARLES E. SMITH.